United States Patent
Cheng et al.

(10) Patent No.: US 11,668,076 B2
(45) Date of Patent: Jun. 6, 2023

(54) METHOD AND APPARATUS FOR CONTROLLING EXCAVATOR TO EXCAVATE

(71) Applicant: Beijing Baidu Netcom Science And Technology Co., LTD., Beijing (CN)

(72) Inventors: Xinjing Cheng, Beijing (CN); Ruigang Yang, Beijing (CN); Yajue Yang, Beijing (CN); Feixiang Lu, Beijing (CN); Hao Xu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 634 days.

(21) Appl. No.: 16/677,308

(22) Filed: Nov. 7, 2019

(65) Prior Publication Data
US 2020/0240117 A1    Jul. 30, 2020

(30) Foreign Application Priority Data
Jan. 25, 2019  (CN) .......................... 201910075040.5

(51) Int. Cl.
*E02F 9/26* (2006.01)
*G06T 3/00* (2006.01)
*G06T 7/593* (2017.01)

(52) U.S. Cl.
CPC .............. *E02F 9/262* (2013.01); *E02F 9/265* (2013.01); *G06T 3/0031* (2013.01); *G06T 7/593* (2017.01); *G06T 2207/10012* (2013.01)

(58) Field of Classification Search
None
See application file for complete search history.

(56) References Cited

U.S. PATENT DOCUMENTS

| | | | | |
|---|---|---|---|---|
| 6,108,949 A | * | 8/2000 | Singh | E02F 3/437 701/50 |
| 6,247,538 B1 | * | 6/2001 | Takeda | G05D 1/0251 37/348 |
| 2017/0065349 A1 | * | 3/2017 | Ourselin | A61B 34/10 |

FOREIGN PATENT DOCUMENTS

| | | |
|---|---|---|
| CN | 104476548 A | 4/2015 |
| CN | 106836364 A | 6/2017 |
| JP | H04350220 A | 12/1992 |
| JP | H09228426 A | 9/1997 |
| JP | H1088625 A | 4/1998 |
| JP | H11247230 A | 9/1999 |
| KR | 19990082460 A | 11/1999 |
| WO | WO2017/222136 A1 | 12/2017 |
| WO | WO-2018174154 A1 | 9/2018 |

OTHER PUBLICATIONS

Chinese Office Action dated Sep. 2, 2021 issued in CN Application No. 201910075040.5.

* cited by examiner

*Primary Examiner* — Xiaolan Xu
(74) *Attorney, Agent, or Firm* — Weaver Austin Villeneuve & Sampson LLP (57) ABSTRACT

Embodiments of the present disclosure relate to a method and apparatus for controlling an excavator to excavate. The method includes: acquiring a two-dimensional image of a material pile; generating a three-dimensional model of the material pile based on the two-dimensional image; analyzing the three-dimensional model to determine a target excavating point and a target excavating trajectory of the material pile; and controlling an excavator to excavate a material at the target excavating point along the target excavating trajectory.

11 Claims, 5 Drawing Sheets

METHOD AND APPARATUS FOR CONTROLLING EXCAVATOR TO EXCAVATE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of excavation technology, and specifically to a method and apparatus for controlling an excavator to excavate.

BACKGROUND

Excavator, also known as earth mover, is generally an earthmoving machine that uses a bucket to excavate a material above or below an excavator carrying surface and loads the same into a transportation vehicle or unloads the same into a stockyard. Current excavator relies primarily on the manual operation of an excavator driver. In order to improve the economic benefits brought by the excavator, it is necessary to realize a system of fixed operator, fixed excavator and fixed position, and to make responsibilities clear.

However, the operation of the excavator relates to a special operation and requires a driver holding a special operation permit to drive the excavator. Limited by the number of drivers who have the ability to drive an excavator, it is inevitable that the excavator will be idle, resulting in a significant reduction in economic benefits.

SUMMARY

Embodiments of the present disclosure provide a method and apparatus for controlling an excavator to excavate.

In a first aspect, an embodiment of the present disclosure provides a method for controlling an excavator to excavate, comprising: acquiring a two-dimensional image of a material pile; generating a three-dimensional model of the material pile based on the two-dimensional image; analyzing the three-dimensional model to determine a target excavating point and a target excavating trajectory of the material pile; and controlling an excavator to excavate a material at the target excavating point along the target excavating trajectory.

In some embodiments, a side of a body of the excavator is provided with a camera, and the camera captures the two-dimensional image when the body is rotated to unload the material in a bucket.

In some embodiments, the camera is a binocular camera, and the two-dimensional image is a binocular image; and the generating a three-dimensional model of the material pile based on the two-dimensional image comprises: performing image matching on the binocular image to obtain a parallax image of the binocular image; generating a depth image of the material pile based on the parallax image; and performing three-dimensional reconstruction on the depth image to obtain the three-dimensional model of the material pile.

In some embodiments, the analyzing the three-dimensional model to determine a target excavating point and a target excavating trajectory of the material pile comprises: discretizing the three-dimensional model to obtain an excavating point set; acquiring an excavating trajectory set of an excavating point in the excavating point set; selecting a candidate excavating point set based on the excavating trajectory set of the excavating point in the excavating point set; acquiring a material volume of a candidate excavating point in the candidate excavating point set; and selecting a target excavating point and a target excavating trajectory based on the material volume of the candidate excavating point in the candidate excavating point set.

In some embodiments, the controlling an excavator to excavate a material at the target excavating point along the target excavating trajectory comprise: determining a target angle sequence for abase and an excavating arm of the excavator to excavate the material at the target excavating point along the target excavating trajectory; and controlling rotation angles and displacements of the base and the excavating arm based on the target angle sequence, acquiring current angles of the base and the excavating arm from a base angle sensor and an excavating arm sensor of the excavator in real time, and performing closed-loop control based on a size and a positive or negative characteristic of a difference between a current target angle in the target angle sequence and the current angles, so that the base and the excavating arm excavate the material at the target excavating point along the target excavating trajectory.

In a second aspect, an embodiment of the present disclosure provides an apparatus for controlling an excavator to excavate, comprising: an acquisition unit, configured for acquiring a two-dimensional image of a material pile; a generation unit, configured for generating a three-dimensional model of the material pile based on the two-dimensional image; a determination unit, configured for analyzing the three-dimensional model to determine a target excavating point and a target excavating trajectory of the material pile; and a control unit, configured for controlling an excavator to excavate a material at the target excavating point along the target excavating trajectory.

In some embodiments, a side of a body of the excavator is provided with a camera, and the camera captures the two-dimensional image when the body is rotated to unload the material in a bucket.

In some embodiments, the camera is a binocular camera, and the two-dimensional image is a binocular image; and the generation unit comprises: a matching subunit, configured for performing image matching on the binocular image to obtain a parallax image of the binocular image; a generation subunit, configured for generating a depth image of the material pile based on the parallax image; and a reconstruction subunit, configured for performing three-dimensional reconstruction on the depth image to obtain the three-dimensional model of the material pile.

In some embodiments, the determination unit comprises: a discretizing subunit, configured for discretizing the three-dimensional model to obtain an excavating point set; a first acquisition subunit, configured for acquiring an excavating trajectory set of an excavating point in the excavating point set; a first selection subunit, configured for selecting a candidate excavating point set based on the excavating trajectory set of the excavating point in the excavating point set; a second acquisition subunit, configured for acquiring a material volume of a candidate excavating point in the candidate excavating point set; and a second selection subunit, configured for selecting a target excavating point and a target excavating trajectory based on the material volume of the candidate excavating point in the candidate excavating point set.

In some embodiments, the control unit comprise: a determination subunit, configured for determining a target angle sequence for abase and an excavating arm of the excavator to excavate the material at the target excavating point along the target excavating trajectory; and a control subunit, configured for controlling rotation angles and displacements of the base and the excavating arm based on the target angle sequence, acquiring current angles of the base and the excavating arm from a base angle sensor and an excavating arm sensor of the excavator in real time, and performing closed-loop control based on a size and a positive or negative characteristic of a difference between a current target angle in the target angle sequence and the current angles, so as that the base and the excavating arm excavate the material at the target excavating point along the target excavating trajectory.

In a third aspect, an embodiment of the present disclosure provides an electronic device, comprising: one or more processors; and a storage apparatus, storing one or more programs, wherein the one or more programs, when executed by the one or more processors, cause the one or more processors to implement the method according to any implementation in the first aspect.

In a fourth aspect, an embodiment of the present disclosure provides a computer readable medium, storing a computer program, wherein the computer program, when executed by a processor, implements the method according to any implementation in the first aspect.

The method and apparatus for controlling an excavator to excavate provided by some embodiments of the present disclosure first generate a three-dimensional model of the material pile based on an acquired two-dimensional image; and then analyze the three-dimensional model to determine a target excavating point and a target excavating trajectory of the material pile; and finally, control an excavator to excavate a material at the target excavating point along the target excavating trajectory. The excavator is controlled based on the target excavating point and the target excavating trajectory, so that the excavator excavates autonomously, which not only reduces labor costs but also improves economic benefits.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
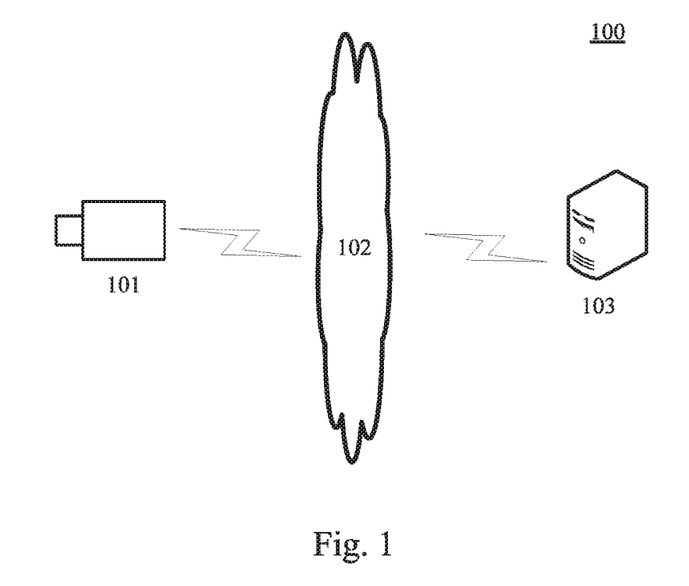
FIG. 1 is a diagram of an example system architecture in which an embodiment of the present disclosure may be implemented.

FIG. 1 shows an example system architecture 100 in which a method for controlling an excavator to excavate or an apparatus for controlling an excavator to excavate according to some embodiments of the present disclosure may be implemented.

As shown in FIG. 1, the system architecture 100 may include a camera 101, a network 102 and a server 103. The network 102 serves as a medium providing a communication link between the camera 101 and the server 103. The network 102 may include various types of connections, such as wired or wireless communication links, or optical fibers.

The camera 101 may be mounted on an autonomous excavator and may capture a two-dimensional image of a material pile to be excavated by the autonomous excavator. Generally, the camera 101 may be a binocular camera mounted on a side of a body of the autonomous excavator. The binocular camera may capture a binocular image when the body is rotated to unload the material in a bucket.

The server 103 may be a server providing various services, for example, a backend server of the autonomous excavator. The backend server of the autonomous excavator may analyze data such as a the two-dimensional image of the material pile acquired from the camera 101, and control the excavator to excavate based on a processing result (for example, a target excavating point and a target excavating trajectory).

It should be noted that the server 103 may be hardware or software. When the server 103 is hardware, the server may be implemented as a distributed server cluster composed of a plurality of servers, or may be implemented as a single server. When the server 103 is software, the server may be implemented as a plurality of software programs or software modules (such as software programs or software modules for providing distributed services), or may be implemented as a single software program or software module, which is not specifically limited herein.

It should be noted that the method for controlling an excavator to excavate provided by some embodiments of the present disclosure is generally executed by the server 103, and the apparatus for controlling an excavator to excavate is generally provided in the server 103.

It should be understood that the numbers of the cameras, networks and servers in FIG. 1 are merely illustrative. Any number of cameras, networks and servers may be provided based on actual requirements.

Figure 2:
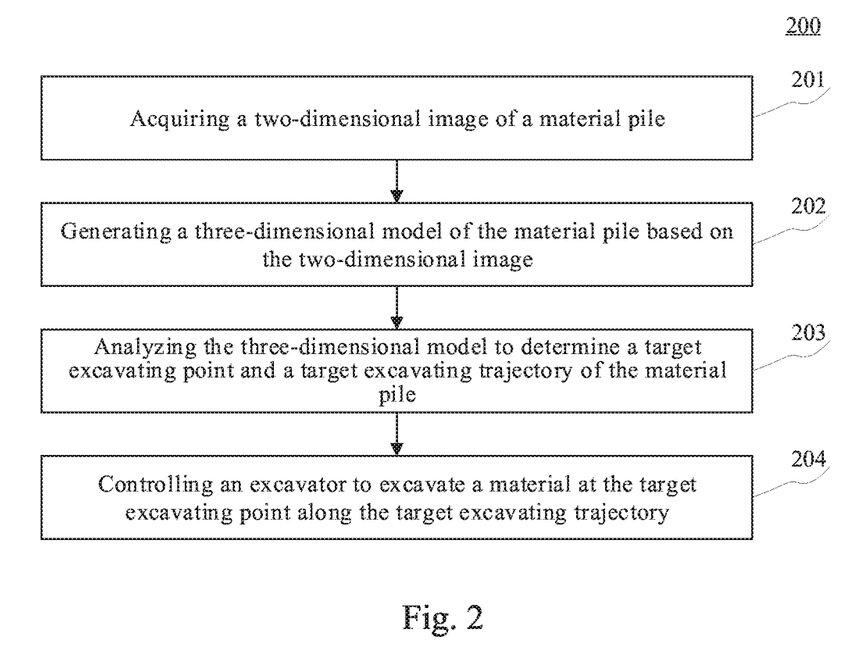
FIG. 2 is a flowchart of a method for controlling an excavator to excavate according to an embodiment of the present disclosure.

Further, referring to FIG. 2, a flow 200 of a method for controlling an excavator according to an embodiment of the present disclosure is shown. The method for controlling an excavator to excavate comprises the following steps.

Step 201: acquiring a two-dimensional image of a material pile.

In the present embodiment, an executing body (for example, the server 103 shown in FIG. 1) of the method for controlling an excavator to excavate may acquire a two-dimensional image of a material pile from a camera (for example, the camera 101 shown in FIG. 1) mounted on an autonomous excavator by means of a wired or a wireless connection. The material pile may be formed by stacking materials together. The materials are mainly soil, coal, silt and pre-loosened soil and rock.

Generally, a camera may be mounted on an autonomous excavator to capture a two-dimensional image of a material pile. In order to prevent an excavating arm of the autonomous excavator from obscuring the camera to capture the material pile, the camera may be mounted on a side of a body of the autonomous excavator. When the body is rotated to unload the material in a bucket, the camera mounted on the side of the body faces the material pile, and the camera, at this time, may be turned on to capture the material pile.

Step 202: generating a three-dimensional model of the material pile based on the two-dimensional image.

In the present embodiment, the executing body may analyze the two-dimensional image and generate a three-dimensional model of the material pile based on an analysis result.

In some optional implementations of the present embodiment, the camera may capture two-dimensional images of the material pile in a plurality of angles when the body is rotated to unload the material in the bucket. In this way, the executing body may perform three-dimensional reconstruction using the two-dimensional images in a plurality of angles so as to obtain a three-dimensional model of the material pile.

In some optional implementations of the present embodiment, the camera mounted on the side of the body of the excavator may be a binocular camera. At this time, the two-dimensional image of the material pile captured by the binocular camera when the body is rotated to unload the material in the bucket may be a binocular image. Since the binocular image is captured by the binocular camera by imitating a working mechanism of the eyes of an animal, there is a certain degree of horizontal parallax between each group of binocular images. Hence, the executing body may determine the distance from the material pile to the binocular camera according to the horizontal parallax, that is, obtain a depth map of the material pile. Subsequently, the executing body may perform three-dimensional reconstruction on the depth map of the material pile by using a three-dimensional reconstruction algorithm, thereby obtaining a three-dimensional model of the material pile. For example, the executing body may first perform image matching on the binocular image to obtain a parallax image of the binocular image; then generate a depth map of the material pile based on the parallax image; and finally, perform three-dimensional reconstruction on the depth map by using a Kinect Fusion algorithm to obtain a three-dimensional model of the material pile.

Step 203: analyzing the three-dimensional model to determine a target excavating point and a target excavating trajectory of the material pile.

In the present embodiment, the executing body may analyze the three-dimensional model of the material pile, and determine a target excavating point and a target excavating trajectory of the material pile according to an analysis result.

Figure 3:
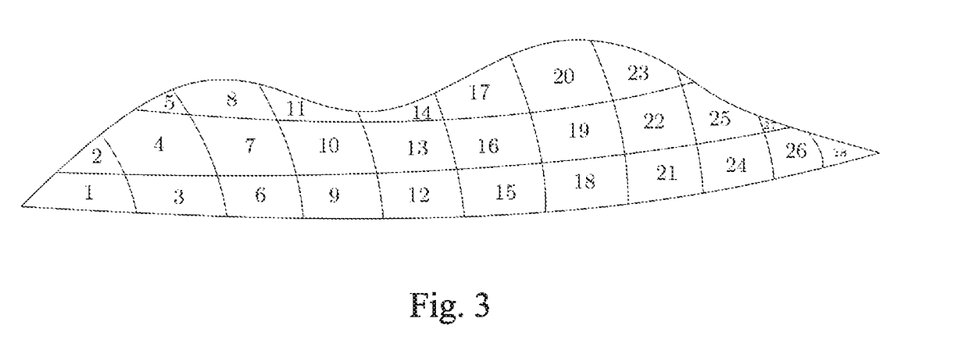
FIG. 3 is a schematic diagram of a discretized three-dimensional model.

Generally, the executing body may discretize the three-dimensional model of the material pile to obtain an excavating point set. For example, the executing body may perform mesh discretization on the three-dimensional model of the material pile in height to obtain a plurality of meshes. One mesh corresponds to one excavating point. Alternatively, a method for discretizing a height map may be a contour line discretization. FIG. 3 shows a schematic diagram of a discretized three-dimensional model. In FIG. 3, the three-dimensional model of the material pile is discretized into 28 meshes using the contour line discretization method, and the 28 meshes are sequentially labeled from bottom to top and from left to right.

Figure 4:
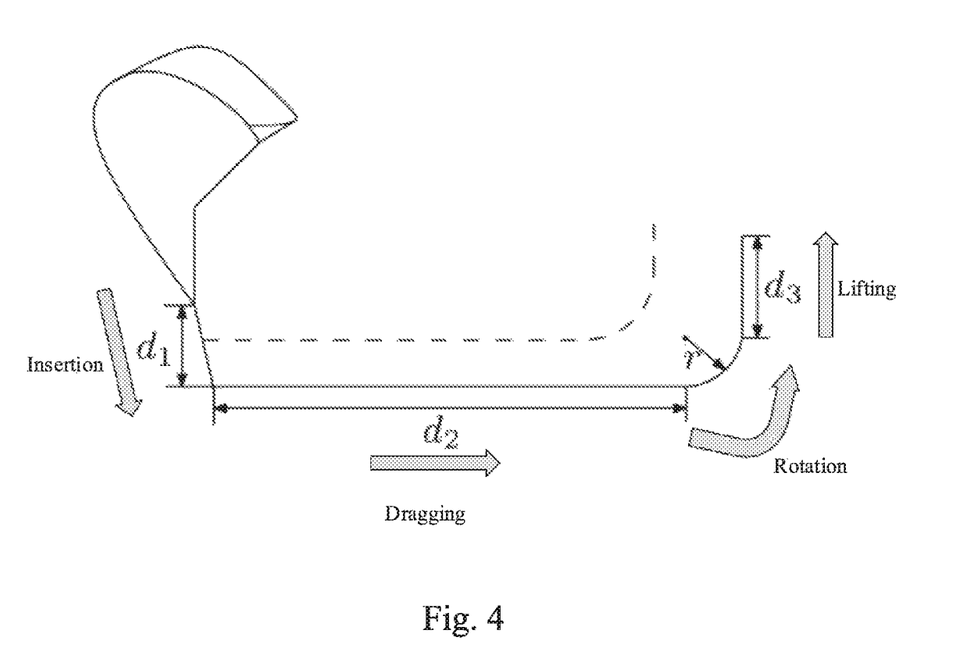
FIG. 4 is a schematic diagram of an excavating trajectory.

In practice, the excavating trajectory may be decomposed into the following four parts: insertion, dragging, rotation and lifting. Accordingly, the entire excavating trajectory may be characterized by four parameters, namely $d_1$ (insertion depth), $d_2$ (dragging length), r (rotation radius) and $d_3$ (lifting height). FIG. 4 shows a schematic diagram of the excavating trajectory. In FIG. 4, the four parts into which the excavating trajectory is decomposed and the four parameters are labeled on the excavating trajectory.

Since the four parameters have respective value ranges, the four parameters belonging to the values in the value ranges are arbitrarily combined to obtain a plurality of excavating trajectories, that is, an excavating trajectory set.

Here, the executing body may analyze an excavating trajectory set of each excavating point in the excavating point set, and select a target excavating point based on an analysis result. Usually, not all excavating trajectories are feasible due to obstacles or the mechanical structure of the autonomous excavator. Therefore, an excavating point with a feasible excavating trajectory in the excavating trajectory set is the target excavating point, and the feasible excavating trajectory may be the target excavating trajectory.

Step 204: controlling an excavator to excavate a material at the target excavating point along the target excavating trajectory.

In the present embodiment, the executing body may send a control command to a plurality of devices (such as a base and an excavating arm) of the autonomous excavator based on the target excavating point and the target excavating trajectory, so as to enable the autonomous excavator to excavate a material at the target excavating point along the target excavating trajectory autonomously.

The method for controlling an excavator to excavate provided by some embodiments of the present disclosure first generates a three-dimensional model of the material pile based on an acquired two-dimensional image; and then analyzes the three-dimensional model of the material pile to determine a target excavating point and a target excavating trajectory for the material pile; and finally, controls an excavator to excavate a material at the target excavating point along the target excavating trajectory. An excavation process of the excavator is controlled based on the target excavating point and the target excavating trajectory, so that the excavator excavates autonomously, which not only reduces labor costs but also improves economic benefits.

Figure 5:
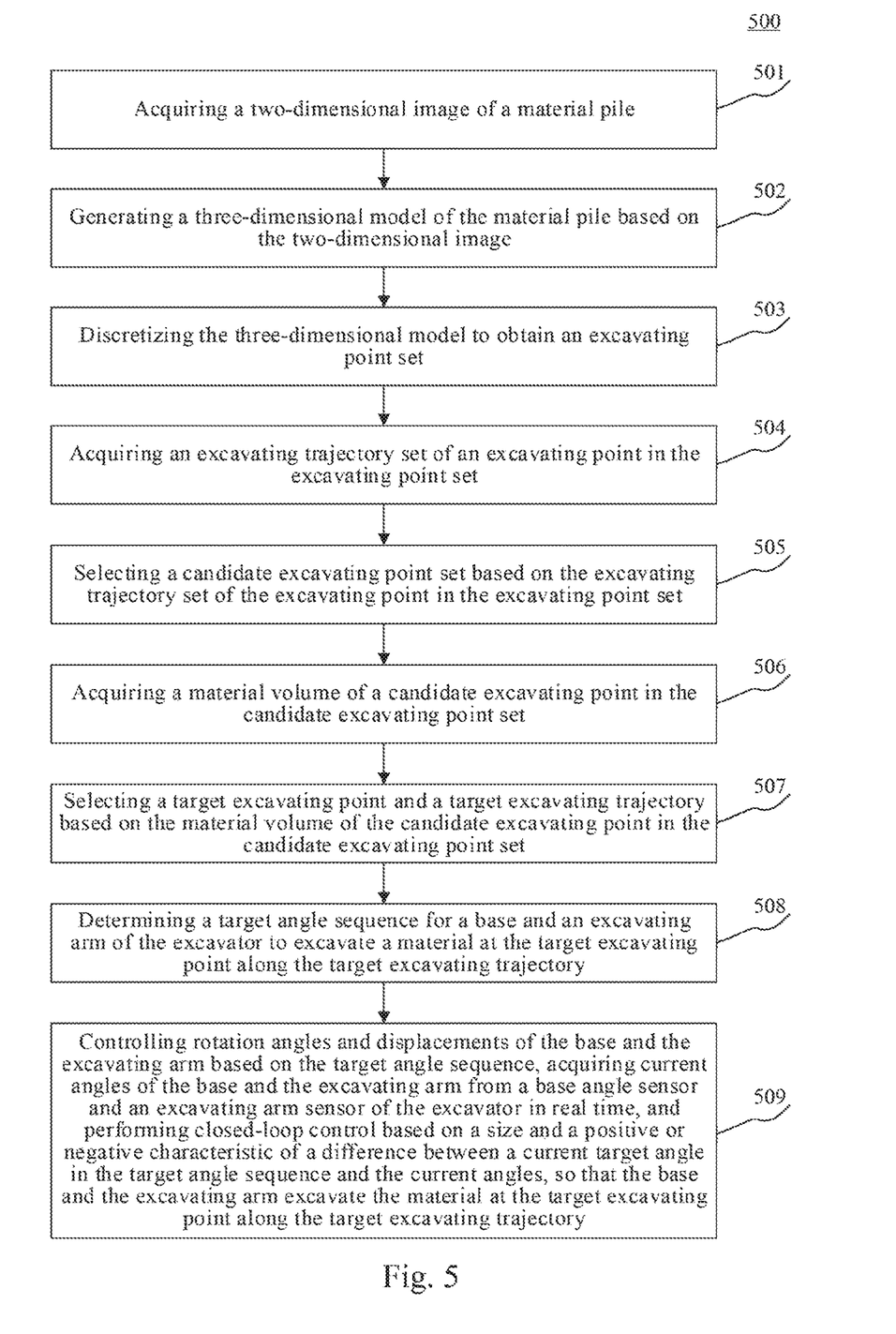
FIG. 5 is a flowchart of a method for controlling an excavator to excavate according to another embodiment of the present disclosure.

Further referring to FIG. 5, a flow 500 of a method for controlling an excavator to excavate according to another embodiment of the present disclosure is shown. The method for controlling an excavator to excavate comprises the following steps.

Step 501: acquiring a two-dimensional image of a material pile.

Step 502: generating a three-dimensional model of the material pile based on the two-dimensional image.

In the present embodiment, specific operations of steps 501-502 have been detailed in steps 201-202 of the embodiment shown in FIG. 2, and will not be repeated here.

Step 503: discretizing the three-dimensional model to obtain an excavating point set.

In the present embodiment, an executing body (for example, the server 103 shown in FIG. 1) of a method for controlling an excavator to excavate may discretize the three-dimensional model of the material pile to obtain an excavating point set. Generally, the executing body may perform mesh discretization on the three-dimensional model of the material pile by using a contour line discretization method so as to obtain a plurality of meshes. One mesh corresponds to one excavating point.

Step 504: acquiring an excavating trajectory set of an excavating point in the excavating point set.

In the present embodiment, the executing body may first acquire, for each excavating point in the excavating point set, an excavating trajectory set of the excavating point. In practice, the excavating trajectory may be decomposed into the following four parts: insertion, dragging, rotation and lifting. Accordingly, the entire excavating trajectory may be characterized by four parameters, namely, $d_1$, $d_2$, r and $d_3$. Since the four parameters have respective value ranges, the four parameters belonging to the values in the value ranges are arbitrarily combined so as to obtain a plurality of excavating trajectories, that is, an excavating trajectory set.

Step 505: selecting a candidate excavating point set based on the excavating trajectory set of the excavating point in the excavating point set.

In the present embodiment, the executing body may analyze, for each excavating point in the excavating point set, an excavating trajectory set of the excavating point in the excavating point set, and determine whether such excavating point is a candidate excavating point based on an analysis result. Usually, not all excavating trajectories are feasible due to obstacles or the mechanical structure of the autonomous excavator. Therefore, an excavating point with a feasible excavating trajectory in the excavating trajectory set is the candidate excavating point, and an excavating point without a feasible excavating trajectory in the excavating trajectory set is not a candidate excavating point.

In some optional implementations of the resent embodiment, the executing body may determine whether there is an excavating trajectory, in which the bucket of the excavator does not collide with an obstacle during movement and an excavating resistance is not greater than an excavating power of the excavator, in the excavating trajectory set of the excavating point. If yes, the excavating point is added, as a candidate excavating point, to a candidate excavating point set, and a determined excavating trajectory is added, as a candidate excavating trajectory, to the candidate excavating point set of the candidate excavating point. Generally, the excavating trajectory, in which the bucket of the excavator does not collide with an obstacle during movement and the excavating resistance is not greater than the excavating power of the excavator, is a feasible excavating trajectory. The excavating trajectory, in which the bucket of the excavator collides with an obstacle during movement or the excavating resistance is greater than the excavation power of the excavator is not a feasible excavating trajectory. In this case, all the candidate excavating trajectories in the candidate excavating trajectory set of the candidate excavating point are feasible excavating trajectories.

Step 506: acquiring a material volume of a candidate excavating point in the candidate excavating point set.

In the present embodiment, the executing body may analyze, for each candidate excavating point in the candidate excavating point set, a material at the candidate excavating point so as to obtain a material volume of the candidate excavating point. Specifically, the executing body may calculate, for each candidate excavating point in the candidate excavating point set, the material volume of the candidate excavating point based on parameters of the candidate excavating trajectory in the candidate excavating trajectory set of the candidate excavating point.

The parameters of the excavating trajectory may include $d_1$, $d_2$, r and $d_3$. Since each candidate excavating trajectory has a set of parameters, a material volume may be calculated based on the parameters of the each candidate excavating trajectory. That is, the each candidate excavating trajectory corresponds to one material volume. In this case, the executing body may first calculate, for each candidate excavating trajectory in the candidate excavating trajectory set of the candidate excavating point, the material volume corresponding to the candidate excavating trajectory based on a width of the bucket of the excavator and the parameters $d_1$ and $d_2$ of the candidate excavating trajectory; and then determine the material volume of the candidate excavating point based on the material volume corresponding to the candidate excavating trajectory in the candidate excavating trajectory set of the candidate excavating point. For example, the executing body may use the product of the width of the bucket and the parameters $d_1$ and $d_2$ of the candidate excavating trajectory as the material volume corresponding to the candidate excavating trajectory; and then the executing body may select the largest material volume from the material volume corresponding to each candidate excavating trajectory in the candidate excavating trajectory set as the material volume of the candidate excavating point.

Step 507: selecting a target excavating point and a target excavating trajectory based on the material volume of the candidate excavating point in the candidate excavating point set.

In the present embodiment, the executing body may analyze, for each candidate excavating point in the candidate excavating point set, the material volume of the candidate excavating point to determine whether the candidate excavating point is a target excavating point. If the candidate excavating point is a target excavating point, the candidate excavating trajectory corresponding to the largest material volume in the candidate excavating trajectory set of the candidate excavating point is the target excavating trajectory. For example, the executing body may compare the material volume of the candidate excavating point with a preset volume threshold. If the material volume is greater than the preset volume threshold, the candidate excavating point is used as the target excavating point. For another example, the executing body may select, from the candidate excavating point set, a candidate excavating point having the largest material volume as the target excavating point.

Step 508: determining a target angle sequence for a base and an excavating arm of the excavator to excavate a material at the target excavating point along the target excavating trajectory.

In the present embodiment, the executing body may analyze the target excavating trajectory to determine a target angle sequence for abase and an excavating arm of the excavator to excavate a material at the target excavating point along the target excavating trajectory. The target angle sequence may include target angles of the base and the excavation arm at each sampling point on the target excavating trajectory. Generally, the executing body may calculate a position and an orientation at an end position according to the parameters $d_1$, $d_2$, r and $d_3$ of the target excavating trajectory; and then obtain target angles of the base and the excavating arm at the each sampling point on the target excavating trajectory by inverse kinematics, and generate a target angle sequence.

Step 509: controlling rotation angles and displacements of the base and the excavating arm based on the target angle sequence, acquiring current angles of the base and the excavating arm from a base angle sensor and an excavating arm sensor of the excavator in real time, and performing closed-loop control based on a size and a positive or negative characteristic of a difference between a current target angle in the target angle sequence and the current angles, so that the base and the excavating arm excavate the material at the target excavating point along the target excavating trajectory.

In the present embodiment, for a current target angle in the target angle sequence, the executing body may control rotation angles and displacements of the base and the excavation arm according to the current target angle. At the same time, the executing body may also obtain current angles of the base and the excavating arm in real time from the base angle sensor and the excavating arm sensor in real time. Usually, if the current angles of the base and the excavation arm are equal to the current target angle, the base and the excavation arm are not deviated from the target excavating trajectory. However, in actual operation, the base and the excavation arm will inevitably deviate from the target excavating trajectory due to a resistance. At this time, the executing body may perform closed-loop control based on a size and a positive or negative characteristic of a difference between the current target angle and the current angles, so that the base and the excavating arm excavate the material at the target excavating point along the target excavating trajectory; and then proceed to execute the steps above when a next target angle of the current target angle becomes the current target angle. The steps are repeated until the executing body completes the closed-loop control according to the last target angle in the target angle sequence. At this time, the base and the excavation arm complete the excavation of the material at the target excavating point along the target excavating trajectory.

Here, the autonomous excavator may realize closed-loop control over an excavation process by providing an upper computer and a lower computer. A two-bit control algorithm is designed for a controller in the upper computer. The two-bit controller is a controller with two bits, and outputs 0 or 1 depending on a size and a positive or negative characteristic of a difference between the current target angle and the current angles. 0 means that a solenoid valve is off, and 1 means that the solenoid valve is on. Meanwhile, a threshold is set for each degree of freedom so as to suppress oscillation of the system. The lower computer uses a PCI (Peripheral Component Interconnect) board to collect sensor data and send an excavation control command. A sensor system uses a guyed displacement sensor and a rotating potentiometer to feed back a displacement and a rotation angle under the each degree of freedom.

It should be noted that after the base and the excavation arm complete the excavation of the material at the target excavating point along the target excavating trajectory, the body may be rotated to unload the material in the bucket onto a tip lorry. At this time, the binocular camera mounted on the side of the body is turned on again to capture the material pile, and the method for controlling an excavator to excavate according to some embodiments of the present disclosure is continued. The steps above are repeated until the whole material pile is excavated.

Figure 6:
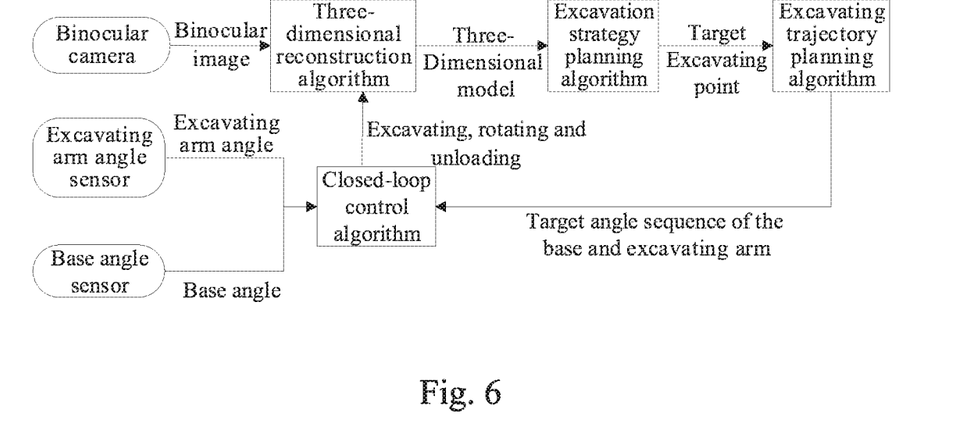
FIG. 6 is a schematic diagram of an application scenario of the method for controlling an excavator to excavate provided in FIG. 5.

Further referring to FIG. 6, a schematic diagram of an application scenario of the method for controlling an excavator to excavate provided in FIG. 5 is shown. In the application scenario shown in FIG. 6, a binocular camera mounted on a side of a body of an autonomous excavator may capture a binocular image of a soil pile and send the captured binocular image to a backend server of the autonomous excavator, when the body of the autonomous excavator is rotated to unload soil in a bucket. First, the backend server may perform three-dimensional reconstruction on the binocular image using a three-dimensional reconstruction algorithm to obtain a three-dimensional model of the soil pile. Next, the backend server may analyze the three-dimensional model using an excavation strategy planning algorithm to determine a target excavating point of the soil pile. Then, the backend server may analyze the target excavating point using an excavating trajectory planning algorithm, and determine a target angle sequence for a base and an excavating arm. Finally, the backend server may control angles and displacements of the base and the excavating arm according to the target angle sequence thereof, so that the autonomous excavator excavate autonomously. Meanwhile, during autonomous excavation, an excavating arm sensor collects an angle of the excavating arm in real time and sends the same to the backend server, and a base sensor collects an angle of the base in real time and sends the same to the backend server. The backend server may perform closed-loop control using a closed-loop control algorithm based on the target angle sequence, the arm angle and the base angle, so that the base and the excavation arm excavate the soil pile at the target excavating point along the target excavating trajectory. If the excavation is completed, the excavator rotates the body to unload the soil in the bucket into the tip lorry. At this point, the binocular camera is turned on again to capture the soil pile, and the steps above are continued. The steps above are repeated until the whole soil pile is excavated.

As may be seen from FIG. 5, the flow 500 of the method for controlling an excavator to excavate in the present embodiment highlights the steps of determining the target excavating point and the target excavating trajectory of the material pile, and controlling the excavator to excavate, as compared with the embodiment corresponding to FIG. 2. Therefore, since the target excavating point and the target excavating trajectory are selected based on the excavating trajectory and the material volume, not only the material at the target excavating point may be excavated along a feasible excavating trajectory, but also a larger material may be excavated at the target excavating point, which improves the excavation efficiency. At the same time, closed-loop control is performed on the excavation process of the excavator, thereby precisely controlling the autonomous excavation process of the excavator.

Figure 7:
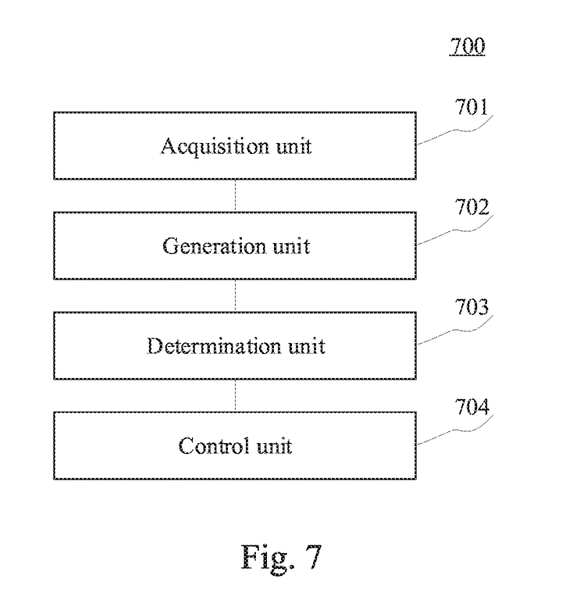
FIG. 7 is a schematic diagram of an apparatus for controlling an excavator to excavate according to an embodiment of the present disclosure.

Further referring to FIG. 7, as an implementation of the method shown in each figure, an embodiment of the present disclosure provides an apparatus for controlling an excavator to excavate. The apparatus embodiment may correspond to the method embodiment shown in FIG. 2, and the apparatus may be specifically applied to various electronic devices.

As shown in FIG. 7, an apparatus 700 for controlling an excavator to excavate in the present embodiment comprises an acquisition unit 701, a generation unit 702, a determination unit 703 and a control unit 704. The acquisition unit 701 is configured for acquiring a two-dimensional image of a material pile; the generation unit 702 is configured for generating a three-dimensional model of the material pile based on the two-dimensional image; the determination unit 703 is configured for analyzing the three-dimensional model to determine a target excavating point and a target excavating trajectory of the material pile; and the control unit 704 is configured for controlling an excavator to excavate a material at the target excavating point along the target excavating trajectory.

In the present embodiment, the specific processing of the acquisition unit 701, the generation unit 702, the determination unit 703 and the control unit 704 in the apparatus 700 for controlling an excavator to excavate and technical effects brought thereby may be respectively referred to steps 201, 202, 203 and 204 in the embodiment corresponding to FIG. 2, and will not be repeated here.

In some optional implementations of the present embodiment, a side of a body of the excavator is provided with a camera, and the camera captures the two-dimensional image when the body is rotated to unload the material in a bucket.

In some optional implementations of the present embodiment, the camera is a binocular camera, and the two-dimensional image is a binocular image; and the generation unit 702 comprises: a matching subunit (not shown), configured for performing image matching on the binocular image to obtain a parallax image of the binocular image; a generation subunit (not shown), configured for generating a depth image of the material pile based on the parallax image; and a reconstruction subunit (not shown), configured for performing three-dimensional reconstruction on the depth image to obtain a three-dimensional model of the material pile.

In some optional implementations of the present embodiment, the determination unit 703 comprises: a discretization subunit (not shown), configured for discretizing the three-dimensional model to obtain an excavating point set; a first acquisition subunit (not shown), configured for acquiring an excavating trajectory set of an excavating point in the excavating point set; a first selection subunit, configured for selecting a candidate excavating point set based on the excavating trajectory set of the excavating point in the excavating point set; a second acquisition subunit (not shown), configured for acquiring a material volume of a candidate excavating point in the candidate excavating point set; and a second selection subunit (not shown), configured for selecting a target excavating point and a target excavating trajectory based on the material volume of the candidate excavating point in the candidate excavating point set.

In some optional implementations of the present embodiment, the control unit 704 comprise: a determination subunit (not shown), configured for determining a target angle sequence for a base and an excavating arm of the excavator to excavate the material at the target excavating point along the target excavating trajectory; and a control subunit (not shown), configured for controlling rotation angles and displacements of the base and the excavating arm based on the target angle sequence, acquiring current angles of the base and the excavating arm from a base angle sensor and an excavating arm sensor of the excavator in real time, and performing closed-loop control based on a size and a positive or negative characteristic of a difference between a current target angle in the target angle sequence and the current angles, so that the base and the excavating arm excavate the material at the target excavating point along the target excavating trajectory.

Figure 8:
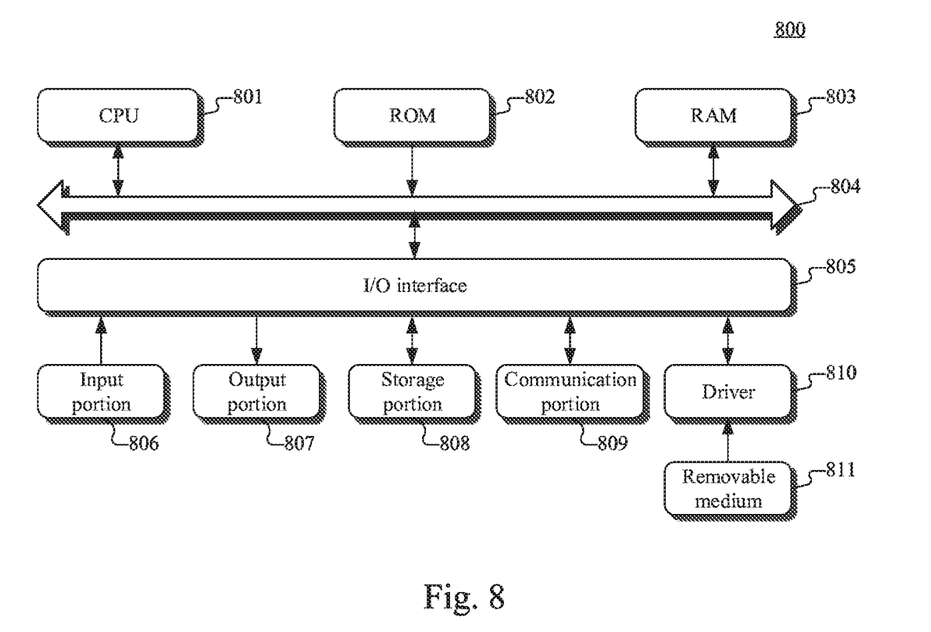
FIG. 8 is a schematic structural diagram of a computer system adapted to implement an electronic device according to embodiments of the present disclosure.

Referring to FIG. 8, a schematic structural diagram of a computer system 800 adapted to implement an electronic device (for example, the server 103 shown in FIG. 1) of some embodiments of the present disclosure is shown. The electronic device shown in FIG. 8 is merely an example, and should not limit the function and scope of use of some embodiments of the present disclosure.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard and a mouse; an output portion 807 including a cathode ray tube (CRT), a liquid crystal display device (LCD) and a speaker; a storage portion 808 including a hard disk; and a communication portion 809 including a network interface card, such as an LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk and a semiconductor memory, may be mounted on the driver 810, so that a computer program read therefrom is mounted on the storage portion 808 as needed.

In particular, according to embodiments of the present disclosure, the process described above with reference to the flowchart may be implemented in a computer software program. For example, an embodiment of the present disclosure includes a computer program product, which comprises a computer program that is tangibly embedded in a machine-readable medium. The computer program includes program codes for executing the method as illustrated in the flowchart. In such an embodiment, the computer program may be downloaded and mounted from a network via the communication portion 809, and/or may be mounted from the removable medium 811. The computer program, when executed by the CPU 801, implements the functions as defined by the methods of some embodiments of the present disclosure. It should be noted that the computer readable medium in some embodiments of the present disclosure may be a computer readable signal medium or a computer readable storage medium or any combination of the above two. An example of the computer readable medium may include, but is not limited to: electric, magnetic, optical, electromagnetic, infrared, or semiconductor systems, apparatus, elements, or a combination of any of the above. A more specific example of the computer readable medium may include but is not limited to: an electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable medium may be any tangible medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The computer readable signal medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flowcharts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some optional implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units involved in some embodiments of the present disclosure may be implemented by means of software or hardware. The described units may also be provided in a processor, for example, described as: a processor including an acquisition unit, a generation unit, a determination unit and a control unit. In some case, names of these units do not constitute the definition of the units themselves, and the acquisition unit may also be described as "a unit configured for acquiring a binocular image of the material pile."

In another aspect, an embodiment of the present disclosure further provides a computer readable medium. The computer readable medium may be included in the electronic device in the above described embodiments, or a stand-alone computer readable medium not assembled into the electronic device. The computer readable medium stores one or more programs. The one or more programs, when executed by the electronic device, cause the electronic device to: acquire a two-dimensional image of a material pile; generate a three-dimensional model of the material pile based on the two-dimensional image; analyze the three-dimensional model to determine a target excavating point and a target excavating trajectory of the material pile; and control an excavator to excavate a material at the target excavating point along the target excavating trajectory.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling an excavator to excavate, comprising:
    acquiring a two-dimensional image of a material pile;
    generating a three-dimensional model of the material pile based on the two-dimensional image;
    analyzing the three-dimensional model to determine a target excavating point on the material pile and a target excavating trajectory of a bucket of the excavator, wherein the target excavating trajectory is decomposed into four parts: insertion, dragging, rotation, and lifting, and the target excavating trajectory is characterized by four parameters: an insertion depth of the bucket in the material pile, a dragging length of the bucket in the material pile, a rotation radius of the bucket, and a lifting height of the bucket; and
    controlling the excavator to excavate a material at the target excavating point along the target excavating trajectory, comprising:
        determining a target angle sequence for a base and an excavating arm of the excavator to excavate the material at the target excavating point along the target excavating trajectory, wherein the target angle sequence includes a sequence of target angles of the base and the excavation arm at sampling points on the target excavating trajectory; and
        controlling rotation angles and displacements of the base and the excavating arm based on the target angle sequence.

2. The method according to claim 1, wherein a side of a body of the excavator is provided with a camera, and the camera captures the two-dimensional image when the body is rotated to unload the material in the bucket.

3. The method according to claim 2, wherein the camera is a binocular camera, and the two-dimensional image is a binocular image; and
    the generating a three-dimensional model of the material pile based on the two-dimensional image comprises:

performing image matching on the binocular image to obtain a parallax image of the binocular image;

generating a depth image of the material pile based on the parallax image; and performing three-dimensional reconstruction on the depth image to obtain the three-dimensional model of the material pile.

4. The method according to claim 1, wherein the analyzing the three-dimensional model to determine a target excavating point and a target excavating trajectory of the material pile comprises:

discretizing the three-dimensional model to obtain an excavating point set;

acquiring an excavating trajectory set of an excavating point in the excavating point set;

selecting a candidate excavating point set based on the excavating trajectory set of the excavating point in the excavating point set;

acquiring a material volume of a candidate excavating point in the candidate excavating point set; and selecting a target excavating point and a target excavating trajectory based on the material volume of the candidate excavating point in the candidate excavating point set.

5. The method according to claim 1, wherein the controlling an excavator to excavate a material at the target excavating point along the target excavating trajectory further comprises:

acquiring current angles of the base and the excavating arm from a base angle sensor and an excavating arm sensor of the excavator in real time, and performing closed-loop control based on a size and a positive or negative characteristic of a difference between a current target angle in the target angle sequence and the current angles, so that the base and the excavating arm excavate the material at the target excavating point along the target excavating trajectory.

6. An apparatus for controlling an excavator to excavate, comprising:

at least one processor; and a memory storing instructions, the instructions when executed by the at least one processor, cause the at least one processor to perform operations, the operations comprising:

acquiring a two-dimensional image of a material pile;

generating a three-dimensional model of the material pile based on the two-dimensional image;

analyzing the three-dimensional model to determine a target excavating point on the material pile and a target excavating trajectory of a bucket of the excavator, wherein the target excavating trajectory is decomposed into four parts: insertion, dragging, rotation, and lifting, and the target excavating trajectory is characterized by four parameters: an insertion depth of the bucket in the material pile, a dragging length of the bucket in the material pile, a rotation radius of the bucket, and a lifting height of the bucket; and controlling the excavator to excavate a material at the target excavating point along the target excavating trajectory, comprising:

determining a target angle sequence for a base and an excavating arm of the excavator to excavate the material at the target excavating point along the target excavating trajectory, wherein the target angle sequence include a sequence of target angles of the base and the excavation arm at sampling points on the target excavating trajectory; and controlling rotation angles and displacements of the base and the excavating arm based on the target angle sequence.

7. The apparatus according to claim 6, wherein a side of a body of the excavator is provided with a camera, and the camera captures the two-dimensional image when the body is rotated to unload the material in the bucket.

8. The apparatus according to claim 7, wherein the camera is a binocular camera, and the two-dimensional image is a binocular image; and the generating a three-dimensional model of the material pile based on the two-dimensional image comprises:

performing image matching on the binocular image to obtain a parallax image of the binocular image;

generating a depth image of the material pile based on the parallax image; and performing three-dimensional reconstruction on the depth image to obtain the three-dimensional model of the material pile.

9. The apparatus according to claim 6, wherein the analyzing the three-dimensional model to determine a target excavating point and a target excavating trajectory of the material pile comprises:

discretizing the three-dimensional model to obtain an excavating point set;

acquiring an excavating trajectory set of an excavating point in the excavating point set;

selecting a candidate excavating point set based on the excavating trajectory set of the excavating point in the excavating point set;

acquiring a material volume of a candidate excavating point in the candidate excavating point set; and selecting a target excavating point and a target excavating trajectory based on the material volume of the candidate excavating point in the candidate excavating point set.

10. The apparatus according to claim 6, wherein the controlling an excavator to excavate a material at the target excavating point along the target excavating trajectory further comprises:

acquiring current angles of the base and the excavating arm from a base angle sensor and an excavating arm sensor of the excavator in real time, and performing closed-loop control based on a size and a positive or negative characteristic of a difference between a current target angle in the target angle sequence and the current angles, so that the base and the excavating arm excavate the material at the target excavating point along the target excavating trajectory.

11. A non-transitory computer readable medium, storing a computer program, wherein the computer program, when executed by a processor, causes the processor to perform operations for controlling an excavator to excavate, the operations comprising:

acquiring a two-dimensional image of a material pile;

generating a three-dimensional model of the material pile based on the two-dimensional image;

analyzing the three-dimensional model to determine a target excavating point on the material pile and a target excavating trajectory of a bucket of the excavator, wherein the target excavating trajectory is decomposed into four parts: insertion, dragging, rotation, and lifting, and the target excavating trajectory is characterized by four parameters: an insertion depth of the bucket in the material pile, a dragging length of the bucket in the material pile, a rotation radius of the bucket, and a lifting height of the bucket; and controlling the excavator to excavate a material at the target excavating point along the target excavating trajectory, comprising:
   determining a target angle sequence for a base and an excavating arm of the excavator to excavate the material at the target excavating point along the target excavating trajectory, wherein the target angle sequence include a sequence of target angles of the base and the excavation arm at sampling points on the target excavating trajectory; and
   controlling rotation angles and displacements of the base and the excavating arm based on the target angle sequence.

* * * * *